(12) United States Patent
Lettkeman et al.

(10) Patent No.: US 7,338,990 B2
(45) Date of Patent: *Mar. 4, 2008

(54) HIGH MOLECULAR WEIGHT ADDITIVES FOR CALCINED GYPSUM AND CEMENTITIOUS COMPOSITIONS

(75) Inventors: Dennis Mark Lettkeman, Watonga, OK (US); Raymond A. Kaligian, II, Geneva, IL (US); William K. Bedwell, Okeene, OK (US); Eldon L. Whiteside, Hinsdale, IL (US)

(73) Assignee: United States Gypsum Company, Chicago, IL (US)

( * ) Notice: Subject to any disclaimer, the term of this patent is extended or adjusted under 35 U.S.C. 154(b) by 460 days.

This patent is subject to a terminal disclaimer.

(21) Appl. No.: 10/511,499

(22) PCT Filed: Mar. 27, 2003

(86) PCT No.: PCT/US03/09397

§ 371 (c)(1),
(2), (4) Date: Oct. 15, 2004

(87) PCT Pub. No.: WO03/082765

PCT Pub. Date: Oct. 9, 2003

(65) Prior Publication Data

US 2005/0239924 A1    Oct. 27, 2005

Related U.S. Application Data

(60) Provisional application No. 60/367,920, filed on Mar. 27, 2002.

(51) Int. Cl.
C04B 24/32 (2006.01)

(52) U.S. Cl. .............................................. 524/5
(58) Field of Classification Search ............... 524/4–5
See application file for complete search history.

(56) References Cited

U.S. PATENT DOCUMENTS

| | | | |
|---|---|---|---|
| 3,573,947 A | 4/1971 | Kinkade et al. | |
| 3,869,415 A * | 3/1975 | Williams | 524/2 |
| 4,028,125 A | 6/1977 | Martin | |
| 4,041,203 A | 8/1977 | Brock et al. | |
| 4,067,939 A * | 1/1978 | Lowe et al. | 264/42 |
| 4,202,857 A | 5/1980 | Lowe | |
| 4,238,239 A | 12/1980 | Brown | |
| 4,341,560 A | 7/1982 | Saito et al. | |
| 4,471,100 A | 9/1984 | Tsubakimoto et al. | |
| 4,494,990 A * | 1/1985 | Harris | 524/5 |
| 4,666,971 A | 5/1987 | Greenhalgh | |
| 4,746,365 A * | 5/1988 | Babcock et al. | 524/4 |
| 4,814,014 A | 3/1989 | Arfaei | |
| 4,960,465 A | 10/1990 | Arfaei | |
| 5,118,751 A | 6/1992 | Schulze et al. | |
| 5,169,706 A | 12/1992 | Collier, IV et al. | |
| 5,175,278 A | 12/1992 | Peik et al. | |
| 5,223,036 A | 6/1993 | Koyata et al. | |
| 5,362,323 A | 11/1994 | Koyata et al. | |
| 5,369,198 A | 11/1994 | Albrecht et al. | |
| 5,387,626 A | 2/1995 | Bohme-Kovac et al. | |
| 5,393,343 A | 2/1995 | Darwin et al. | |
| 5,424,099 A | 6/1995 | Stewart et al. | |
| 5,472,500 A | 12/1995 | Janicki | |
| 5,514,744 A * | 5/1996 | Brown | 524/423 |
| 5,556,460 A | 9/1996 | Berke et al. | |
| 5,614,017 A | 3/1997 | Shawl | |
| 5,631,312 A * | 5/1997 | Takada et al. | 524/5 |
| 5,643,978 A | 7/1997 | Darwin et al. | |
| 5,665,158 A | 9/1997 | Darwin et al. | |
| 5,670,578 A | 9/1997 | Shawl | |
| 5,703,174 A | 12/1997 | Arfaei et al. | |
| 5,725,656 A | 3/1998 | Shimanovich et al. | |
| 5,725,657 A | 3/1998 | Darwin et al. | |
| 5,739,212 A | 4/1998 | Wutz et al. | |
| 5,779,786 A | 7/1998 | Patel | |
| 5,798,425 A | 8/1998 | Albrecht et al. | |
| 5,879,446 A | 3/1999 | Patel et al. | |
| 5,925,184 A | 7/1999 | Hirata et al. | |

(Continued)

FOREIGN PATENT DOCUMENTS

| | | |
|---|---|---|
| EP | 0644165 | 3/1995 |
| EP | 0725044 | 8/1996 |
| EP | 1138696 | 10/2001 |
| EP | 1142847 | 10/2001 |
| EP | 1138697 | 11/2003 |
| JP | 56045857 | 4/1981 |
| JP | 59025876 | 2/1984 |
| JP | 60-171260 | * 9/1985 |
| JP | 61040861 | 8/1996 |
| WO | WO 95/33698 | 12/1995 |
| WO | WO 01/81263 | 11/2001 |

OTHER PUBLICATIONS

"A New Generation of Gypsum Dispersing Agents," S. Lee, F. Liotta and S. Schwartz, Global Gypsum Conference 2003 Paper 17, Barcelona. Sep. 14-16, 2002.
"Gypsum Dispersing Agents," Steven A. Schwartz, Global Gypsum Conference 2002, Florida, Mar. 3-4, 2002.

Primary Examiner—Peter Szekely
(74) Attorney, Agent, or Firm—Greer Burns & Crain; David F. Janci; Pradip Sahu

(57) ABSTRACT

A mixture is used in conjunction with water is used for preparing a slurry that hydrates to form an exterior gypsum cement. The mixture includes 30-70% by weight hydraulic cement, 30-70% by weight calcined gypsum and 0.05-2.5% polycarboxylate. When the mixture is added to water less than 40 weight % based on the weight of the mixture, a slurry is formed that expands very little while it cures.

19 Claims, No Drawings

U.S. PATENT DOCUMENTS

| | | |
|---|---|---|
| 5,985,989 A | 11/1999 | Shawl et al. |
| 6,034,208 A | 3/2000 | McDaniel et al. |
| 6,043,329 A | 3/2000 | Lepori et al. |
| 6,068,697 A | 5/2000 | Yamamuro et al. |
| 6,110,271 A | 8/2000 | Skaggs et al. |
| 6,150,437 A | 11/2000 | Wutz et al. |
| 6,166,112 A | 12/2000 | Hirata et al. |
| 6,187,409 B1 | 2/2001 | Mathieu |
| 6,187,887 B1 | 2/2001 | Albrecht et al. |
| 6,264,739 B1 | 7/2001 | Yamato et al. |
| 6,294,015 B1 | 9/2001 | Yamashita et al. |
| 6,355,099 B1 | 3/2002 | Immordino et al. |
| 6,376,581 B1 | 4/2002 | Tanaka et al. |
| 6,488,792 B2 | 12/2002 | Mathieu |
| 6,527,850 B2 | 3/2003 | Schwartz et al. |
| 6,620,879 B1 | 9/2003 | Albrecht et al. |
| 7,056,964 B2 * | 6/2006 | Lettkeman et al. ............ 524/5 |
| 2003/0144384 A1 * | 7/2003 | Chen et al. .................... 524/2 |
| 2003/0167973 A1 | 9/2003 | Peev et al. |

\* cited by examiner

HIGH MOLECULAR WEIGHT ADDITIVES FOR CALCINED GYPSUM AND CEMENTITIOUS COMPOSITIONS

CROSS REFERENCE TO RELATED APPLICATIONS

This application claims the benefit of U.S. Provisional Application 60/367,920, filed Mar. 27, 2002.

BACKGROUND

This invention relates to cast materials for outdoor use. More specifically, it relates to a high strength, low expansion gypsum cement.

Casting of articles is a well known technique for making outdoor lawn and garden products, such as statuary, stepping stones and the like. The casting process, which includes preparing a mold, pouring a slurry of hydraulic material into the mold and allowing it to harden, is less labor intensive, and therefore less expensive, than many other methods of making a shaped article.

Both gypsum and cement are well known hydraulic materials. Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. In this form, there are approximately two water molecules of water associated with each molecule of calcium sulfate. In order to produce the hemihydrate form, the gypsum can be calcined to drive off some of the water of hydration by the following equation:

$CaSO_4 \cdot 2H_2O \rightarrow CaSO_4 \cdot 1/2H_2O + 3/2H_2O$

Calcium sulfate hemihydrate can produce at least two crystal forms. α-Calcined gypsum is made by a continuous process or a lump rock process whereby the calcium sulfate dihydrate is calcined under pressure. The α-calcined gypsum forms less acicular crystals than β-calcined gypsum, allowing the crystals to pack tightly together, making a denser and stronger plaster. The crystal morphology allows water to flow easily between the crystals, requiring less water to form a flowable slurry. More elongated crystals are characteristic of the beta-calcined gypsum. This crystal structure results in a less dense product because the crystals are more loosely packed. The beta form also requires more water to fluidize the calcined gypsum. If the calcining of the dihydrate is performed at ambient pressure, the beta form is obtained and the cost is relatively low compared to the alpha-gypsum.

When the hemihydrate is added to water, the product slurry is permitted to set by allowing the calcium sulfate hemihydrate to react with sufficient water to convert the hemihydrate into a matrix of interlocking dihydrate crystals. As the matrix forms, the product slurry becomes firm and holds the desired shape.

Hydraulic cement is used in various applications where its hardness, water resistance and durability make it valuable, such as in concrete structures. Products that require wearability, hardness or water resistance are often made of a slurry of calcined gypsum mixed with hydraulic cement. Cements, such as Portland cement, set by the relatively slower hydration reactions of calcium silicate and aluminate materials. Consequently, adding calcium sulfate hemihydrate to cement offers a faster set and the resulting increase in productivity during manufacture cement-containing products. Gypsum is, however, somewhat soluble in water, and mixtures that contain both gypsum and hydrated cement are not as water resistant as cement alone or cement containing a minor amount of gypsum.

Cast articles for outdoor use should be strong to hold up to wind, weather and other outdoor hazards. When no additives are used, the amount of water added to a calcined gypsum slurry determines the density of the set gypsum matrix. As more water is used, the slurry increases in volume. The theoretical water demand of pure calcium sulfate hemihydrate is 18.6 wt %. The hydrated calcium sulfate matrix forms filling the volume originally occupied by the slurry, trapping the excess water in the crystal interstices of the gypsum matrix. For equal amounts of gypsum, the interstices are larger and more numerous to take up the excess water as the proportion of water is increased. As the size and number of the spaces increases, both the density and the strength of the matrix decreases compared to a composition with little of no excess water. However, slurries with little excess water are very difficult to mix, particularly if beta-calcined gypsum is used.

However, if water is reduced to increase the strength of cast articles of this type, there is generally an increase in the expansion of the article as the hydraulic materials set. Expansion of hydraulic materials while they set limits the useful life of the molds with which they are used. The expanding article puts pressure on the mold, forming small stress cracks which grow bigger with successive uses. Details in the mold can be lost. The article can become distorted as the mold weakens.

Thus, there is a need in the art for a means to improve the strength of cast articles while creating minimum expansion of the setting slurry material. There is a further need to maintain dimensional stability of cast articles, while extending the life of the molds from which they are made. When these needs are met, products made by casting gypsum or blends of gypsum and hydrated cement can be made stronger, maintain design details and/or be produced at lower cost.

BRIEF DESCRIPTION OF THE INVENTION

These and other needs are met by the present composition which is useful for casting gypsum cement articles for outdoor use.

More specifically, a mixture to be used in conjunction with water is used for preparing a slurry that hydrates to form an exterior gypsum cement. The mixture includes 30-70% by weight hydraulic cement, 30-70% by weight calcined gypsum and 0.05-2.5% polycarboxylate. When the mixture is added to water less than 40 weight % based on the weight of the mixture, a slurry is formed that expands very little while it cures.

Low expansion leads to products that are more true to the molded design. There is no distortion of the pattern as can occur when there is a high degree of expansion. The small amount of expansion is desirable so that the slurry picks up all of the detail of the mold. However, the expansion is not sufficient to cause the mold to be difficult to remove. Unmolding is difficult when expansion causes the cast article to push outward against the mold walls, holding it in place by friction. The low degree of expansion can also lead to longer mold life.

DETAILED DESCRIPTION OF THE INVENTION

A castable gypsum composition having low expansion includes calcium sulfate hemihydrate, hydraulic cement and polycarboxylate dispersant.

Calcium sulfate hemihydrate or calcined gypsum is the major component of the castable mixture. When water is added to this mixture, it encompasses compositions that transform from an aqueous slurry of calcium sulfate hemihydrate to a crystalline dihydrate matrix by hydration. The components include at least 30% calcium sulfate hemihydrate based upon the weight of the aggregate-free dry components. Preferably the aggregate-free dry components include at least 35%, and most preferably at least 40% hemihydrate by weight. Preferred alpha-hemihydrates include those made from a slurry process, such as HYDROCAL C-Base, J-Base or E-Base from United States Gypsum Co. (Chicago, Ill.), by lump rock processes, such as HYDROCAL A-Base or B-Base, or any other method of making alpha-calcined hemihydrate. No. 1 Moulding plaster is a preferred beta-hemihydrate from United States Gypsum Co. (Chicago, Ill.). Synthetic gypsum, which is a byproduct of flue gas desulfurization processes from power plants, may also be used similarly to beta-calcined gypsum.

When it is mined, raw gypsum is found in the dihydrate form. Whether alpha or beta-calcined gypsum, or a combination of both, is selected for a particular application depends on the desired properties of the product being made, the cost or availability of the calcined gypsum. Preferably, beta-calcined gypsum is used to as large extent as possible. However, in some embodiments, such as the "no dry" casting formulation, or anywhere the cast article requires high strength, the alpha form is preferred. Selection of an appropriate calcined gypsum or mixtures thereof for a particular application, is within the ordinary skill of an artisan in this field.

Like gypsum, hydraulic cement hardens due to chemical hydration with water. Preferred hydraulic cements are Portland cement, Class C cement and other Type 5 cements or their equivalents. These cements are most durable in an outdoor setting and the product will be long-lasting. Other cements are believed to be suitable in forming a low-expansion casting composition, however, Type 1 and other cements age rapidly outdoors. They are suitable in the castable composition if long life of the product is not important, or if chemicals are added to the composition to reduce the effects of aging. The most widely used cement is Portland cement (Aalsborg Cement, Denmark), which is particularly preferred for use in this invention. Either gray or white cement can be used.

In the present invention, it has been learned that polycarboxylate dispersants make a castable slurry with improved dimensional stability for longer cast life. Polycarboxylates also improve the flowability of the slurry so that less water is needed to make a flowable slurry. It is advantageous to utilize this property to replace all or a portion of the alpha-gypsum in a formula to the beta form at the same consistency or to reduce the water to make a stronger, denser product. Costs for transportation and shipping time can also be reduced since formulations can be adapted to use either alpha or beta-calcined gypsum, whichever is more readily available.

Water levels can be reduced to at or below the theoretical water demand using polycarboxylate dispersants. Minimization of water addition has the added benefit of requiring less time and/or energy to dry the products. Additionally, less water is absorbed by the mold upon casting, requiring less time and energy to dry the mold for reuse. When water is reduced to levels at or below that theoretically required for complete hydration, aggregates or fillers can be added wet with no loss in product strength. In the set and dried product, polycarboxylates age better than products with other additives.

Polycarboxylates are polymers obtained by polymerization of a monomer mixture that includes an unsaturated carboxylic acid type monomer. The most preferred polycarboxylate polymer, sold under the trade name Melflux 1641, 1643 or 1643F by SKW Polymers (Kennesaw, Ga.), is a co-polymer based on oxyalkyleneglycol-alkyl ethers and unsaturated dicarboxylic acid derivatives such as those described in U.S. Pat. No. 5,798,425, which is herein incorporated by reference. Other suitable polycarboxylates include acrylic resin latexes, modified acrylic polymers such as those described in EP 1138,698, herein incorporated by reference, co-polymers of acrylic acid and acrylamide, polymers obtained by grafting substituents, such as a polyalkyene oxide, on a polycarboxylate backbone, poly(methyl vinyl ether/maleic acid), or any polycarboxylate as will be known to an artisan.

A wide variety of polycarboxylates can be used in this invention, including, but not limited to polyacrylic acids and acrylic latex polymers. Preferably the polycarboxylates are water soluble. The polycarboxylate polymer includes at least two carboxylate salt or ion groups, at least two carboxylic acid groups or at least one carboxylate salt or ion group and at least one carboxylate salt or ion group. Molecular weights of from about 100,000 to about 5,000,000 daltons are preferred. Polycarboxylates outside the preferred molecular weight range can be suitable, but lower molecular weights tend to be less effective, while higher molecular weights are extremely viscous and difficult to pump. Methods of making polycarboxylates are well known to those skilled in the art.

The polycarboxylate dispersants can be added in amounts of from about 0.05% to about 2.5% on a dry solids basis. Other preferred ranges for the polycarboxylate addition include from 0.05% to 1% and from 0.05% to 0.5%, all on a dry solids basis excluding any aggregate that may be present. At the higher end of the range of polycarboxylate addition, retarding of the hydration reactions is observed, as is some reduction in product strength. Efficacy of the additive depends on the exact composition with which it is used. It may be used alone as a superplasticizer or used in combination with other plasticizers including, but not limited to, lignins, sulfonated naphthalene and/or sulfonated melamine dispersants. Use of a pH control additive, such as, but not limited to, lime and/or Portland cement, to provide the slurry with a basic pH improves performance of the polycarboxylates when the slurry has a high concentration of hemihydrate.

The amount of water addition is selected based on the composition being used and the application for which it is intended. When polycarboxylates are added to cement or calcined gypsum compositions having a high concentration of α-calcined gypsum, a flowable slurry can be obtained when the consistency is below the theoretical water demand.

The amount of water added to the dry mixture ranges from 13% of the weight of the dry mixture to about 50% by weight. Preferably, the water content ranges from about 13% to about 40%, and more preferably from about 20% to about 30%. If the hemihydrate is primarily in the beta form, a preferred water range is from 25% to about 40 weight % water based on the weight of the dry ingredients. For ease of mixing, the preferred water range is from about 20% to about 40%. Low water compositions use water in the range of about 13% to about 25%. The selection of a suitable amount of water to be added is within the skill of an artisan.

Water used to make the slurry should be as pure as practical for best control of the properties of both the slurry and the set plaster. Salts and organic compounds are well known to modify the set time of the slurry, varying widely between accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Use of polycarboxylate allows gypsum cements to be made to be mixed with a wet aggregate without a reduction in strength or density. Improved flow properties of gypsum cements with polycarboxylates allow easy mixing even when the consistency is below the theoretical water demand. For example, theoretical water demand for a typical hemihydrate with 93-98% purity is 20-21 wt %. Theoretical water demand for cements is slightly higher.

Consistencies for the combined hemihydrate/cement mixture as low as 15% can be prepared with the addition of polycarboxylate dispersants. If the aggregate is added wet to a composition with a consistency below theoretical, the additional water used to help complete the hydration process of the hemihydrate and cement-based materials. Thus the density and strength of the product is not affected compared to a product at the theoretical consistency.

Set times are often retarded to provide longer working times or accelerated for faster set and finishing. Polycarboxylates have a retarding effect at higher concentrations, but additional retarders or accelerators will often be used to more precisely control the set time. Those skilled in the art of formulating calcined gypsum or cement compositions know how to adjust the level of accelerators and retardants to obtain a desired set time. Preferred retarders include proteinaceous retarders (Industrial SUMA, San Paulo, Brazil), sodium citrate, Cream of Tartar and diethylenetriamine pentaacetic acid (Akzo Nobel, The Netherlands). Additives for accelerating set time include sulfates such as aluminum sulfate or potassium sulfate, acids and proteinacous retarders used in amounts up to 1 wt % on a dry, aggregate-free basis.

Calcium sulfate dihydrate that has been finely ground is a preferred accelerator. When freshly prepared, it has high potency. However, when stored prior to use, it loses its effectiveness. U.S. Pat. No. 2,078,198, herein incorporated by reference, discloses improved accelerators comprising calcium sulfate dihydrate intermixed with sugar. This mixture renders the calcium sulfate dihydrate less subject to deterioration by aging. Heating the co-ground sugar and calcium sulfate dihydrate mixture so that caramelized sugar forms a coating on the calcium sulfate dihydrate is disclosed in U.S. Pat. No. 3,573,947, herein incorporated by reference. The melted sugar coating further stabilizes the calcium sulfate dihydrate, reducing the effects of aging to a greater degree than the unheated sugar/dihydrate mixture. Ground calcium sulfate dihydrate prepared in this manner is referenced in the examples as "CSA" (United States Gypsum Co., Chicago, Ill.)

When aggregates are added to the composition, any aggregate known to those skilled in the art may be used. Sand is the most common aggregate used due to its low cost and ready availability. The aggregate can be chosen to modify the density of the finished product. A wide range of sands are applicable with this invention, including Mohawk Medium sand, Rich Mix Fine sand, Atlanta sand, Dothan Sand, Florida sand and the like. Heavier aggregates, such as, but not limited to, rock, gravel and silica fume would increase the density of the product, while the addition of hadite, clay, pumice, foam, vermiculite or hollow microspheres would decrease the density. Any type of filler, such as perlite, flyash or slag, can also be used. The aggregate is added to the composition in amounts up to 300 wt % of the aggregate-free components on a dry basis.

Calcined gypsum compositions of this invention optionally have a number of further additives depending on the specific application. These additives can include defoamers, thickeners, polymeric resins, preservatives, and other additives. Additives for a particular purpose, as well as the appropriate concentrations, are known to those skilled in the art. Coloring agents, such as pigments, dyes or stains are also useful as additives. Defoamers are useful in amounts less than 10 wt %. A preferred defoamer is Foamaster CN (Astro Chemicals, Kankakee, Ill.). Any known coloring agents can be used with this invention. Titanium dioxide is particularly useful to whiten the composition. The coloring agents are used in amounts and added by methods conventionally used for compositions of this type. Polymeric resins, such as Elotex 10184 or 50E200 (National Starch & Chemical, Bridgewater, N.J.) or VINNAPAS RP-226 (Wacker Polymer Systems, LP, Adrian, Mich.), are optionally added to modify the properties of the slurry.

Use of these additives requires no special mixing steps or process conditions to make a high quality product. Depending on the exact additive selected, it can be available in either liquid form, dry form or both. If used in liquid form, the additive concentration is determined on a dry basis. Typically, wet ingredients are mixed with the water prior to the addition of the dry components. Dry ingredients are often premixed using powder feeders, then the dry composite is added to the mix water that already has the wet ingredients. The additives of this invention are comparable with this common mixing technique, or can be adapted to other mixing methods as will be known by those skilled in the art.

These and other embodiments are demonstrated in the following Examples. In the examples, unless otherwise noted, all amounts listed are in pounds. Concentrations or percentages are calculated on a dry, aggregate-free weight basis.

Unless otherwise noted, a 4000 gram sample was prepared based on the dry components. All dry components, including aggregate, were weighed and dry blended together. The predetermined amount of deionized water was measured and poured into a mixing bowl. The dry blended material was added to the water and the time noted as the starting point to determine the set time. The mixing bowl was placed onto a Hobart mixer and jogged for approximately five seconds. After one minute of soaking, the material was mixed at low speed for two minutes. The bowl was removed from the mixer and the contents stirred for about 15 seconds with a wisk to assure that all material was evenly mixed.

References to set time refer to Vicat set time per ASTM C-472, herein incorporated by reference. The Vicat set time started from the time the plaster was added to the water for hand mixes and from the time the slurry came off the mixer for machine mixes. A sample was made up of 50 grams of dry, aggregate-free material and sufficient water to make a normal consistency for the desired application. The sample was poured onto an acrylic sheet to form a patty. A 300 gram Vicat needle was held half way between the center and the outer edge of the patty, perpendicular to the patty surface. The needle was held to the patty surface and released to fall freely of it's own weight. Set time was determined when the needle failed to penetrate to the bottom of the patty. If the degree of penetration was unclear, the needle was given a little push to determine if it had touched the underlying surface.

EXAMPLE 1

A formulated outdoor gypsum cement was prepared according to Table I, to which varying amounts of polycarboxylate was added per Table II.

TABLE I

Formulated Outdoor Gypsum Cement

| Component | Amount |
| --- | --- |
| α-Calcined Gypsum | 2000 lbs. (908 Kg) |
| White type 5 Cement | 2000 lbs. (908 Kg) |
| Potassium Sulfate | 10.0 lbs. (4.5 Kg) |
| Aluminum Sulfate | 4.5-6.0 lbs. (2.0-2.7 Kg) |
| Plasticizer | 19.2-19.5 lbs. (8.7-8.9 Kg) |
| Defoamer | 4.0 lbs. (1.8 Kg) |

The above base formula was modified by the addition of various amounts of polycarboxylates as shown below in Table II. The amount of aluminum sulfate and potassium sulfate are shown as a range because two batches of material were combined in an unknown ratio. Although the exact amount of these components in the combined dry mix is not known precisely, it is constant, assuring that only the amount of polycarboxylate varies in the data below.

Fifty grams (50 g) of the above base gypsum cement was modified by the addition of Melflux 1641 polycarboxylate as indicated in each of the samples below. Water was added to the mixture until a 4¼" (10.8 cm) patty was formed as described above. The amount of water added to each sample, the patty diameter and the set time of each are included in Table II below:

TABLE II

Water Demand and Set Times with Varying Amounts of Polycarboxylate

| ID | Amount of Polycarboxylate | Patty Diameter | Set Time | Water cc/100 g |
| --- | --- | --- | --- | --- |
| A | 0.0 g | 4⅛" (10.5 cm) | 20 min. | 48 |
| B | 0.025 g | 4¼" (10.8 cm) | 18 min. | 38 |
| C | 0.050 g | 45⁄16" (11.0 cm) | 19 min. | 28 |
| D | 0.075 g | 47⁄16" (11.3 cm) | 13 min. | 24 |
| E | 0.10 g | 4½" (11.4 cm) | 13 min. | 20 |
| F | 0.125 g | 4½" (11.4 cm) | 13 min. | 19 |
| G | 0.150 g | 45⁄16" (11.0 cm) | 14.5 min. | 18 |
| H | 0.175 g | 4¼" (10.8 cm) | 17 min. | 17 |
| I | 0.20 g | 43⁄16" (10.6 cm) | 20 min. | 16 |
| J | 0.225 g | 4½" (11.4 cm) | 22 min. | 16 |
| K | 0.250 g | 4½" (11.4 cm) | 23 min. | 15.5 |

As the amount of polycarboxylates were increased, the water demand of the sample decreased. Set time of the test sample initially decreased as the polycarboxylate concentration increased until approximately the theoretical level of water addition, then increased as the amount of polycarboxylates increased, the additive acted as a retarder.

EXAMPLE 4

The expansion of cast articles was explored by testing two sample castings in an expansometer. Sample A was made from 2500 grams of the Base Gypsum Cement shown in Table I with 6.25 grams of MVA 1641 polycarboxylate added. Sample B was a 2500 gram sample from a similar formula having 30.75 pounds of a melamine dispersant and 13.0 pounds of aluminum sulfate per batch in place of the plasticizer listed in Table III. 2500 Grams of medium Mohawk sand was added to each sample.

TABLE III

Expansion Testing

| Component | Sample A | Sample B |
| --- | --- | --- |
| α-Calcined Gypsum | 2000 lbs. (908 Kg) | 2000 lbs. (908 Kg) |
| White Type V Cement | 2000 lbs. (908 Kg) | 2000 lbs. (908 Kg) |
| Potassium Sulfate | 10 lbs. (4.5 Kg) | 10 lbs. (4.5 Kg) |
| Aluminum Sulfate | 4.5-6.0 lbs. (2.0-2.7 Kg) | 13 lbs. (5.9 Kg) |
| Melamine Dispersant | 19.2-19.5 lbs. (8.7-8.9 Kg) | 30.75 lbs. (14.0 Kg) |
| Defoamer | 4.0 lbs. (1.8 Kg) | 4.0 lbs. (1.8 Kg) |
| Sample Size | 2500 g | 2500 g |
| Melflux 1641 | 6.25 g | 0 g |
| Water | 500 g | 625 g |
| % Expansion | 0.006% | 0.047% |

Expansion was tested in an expansometer. The test slurry was poured into a mold of a standard size and allowed until Vicat Set. The expansometer probe was then placed against the sample and the machine was set to 0. Expansion of the sample was then measured by the probe as the sample continued to cure.

Less expansion was measured in Sample A, the sample that contained the polycarboxylate additive and had a lower consistency. This is particularly surprising because it is generally accepted that lower water demand results in increased expansion. However, the polycarboxylate additive provided less expansion, which is beneficial because expansion of cast articles results in distortion of the desired pattern, difficulty in unmolding the cast article and can lead to shorter mold life.

The embodiments and examples shown herein are intended to exemplify the invention and are not intended to limit it in any way. Additional embodiments and uses for this invention will be apparent to an artisan in this particular field.

What is claimed is:

1. A mixture to be employed in conjunction with water for preparing a slurry that hydrates to form an exterior gypsum cement, comprising:
    30-70% by weight hydraulic cement;
    30-70% by weight calcined gypsum; and
    0.05-2.5% polycarboxylate dispersant, wherein said polycarboxylate dispersant is a co-polymer based on oxyalkyleneglycol-alkyl ethers and unsaturated dicarboxylic acid derivatives.

2. The gypsum cement mixture of claim 1 wherein said calcined gypsum is alpha-calcined gypsum.

3. The gypsum cement mixture of claim 1 wherein said composition comprises 35-65% hydraulic cement.

4. The gypsum cement mixture of claim 1 wherein said composition comprises 35-65% calcined gypsum.

5. The gypsum cement mixture of claim 1 wherein said cement comprises a Type 5 cement.

6. The gypsum cement mixture of claim 1 wherein said composition comprises 0.05-1% polycarboxylate.

7. The gypsum cement mixture of claim 1 wherein said polycarboxylate dispersant is water-soluble.

8. The gypsum cement mixture of claim 1 wherein said polycarboxylate dispersant has a molecular weight range of from about 100,000 to about 5,000,000 Daltons.

9. The gypsum cement mixture of claim 1 wherein said polycarboxylate dispersant comprises an acrylic resin latex, modified acrylic polymers, co-polymers of acrylic acid and acrylamide, polymers obtained by grafting polyalkyene oxide on a polycarbonate backbone or poly (methyl vinyl ether/maleic acid).

10. The gypsum cement mixture of claim 1 further comprising at least one of a set accelerating or set retarding additive.

11. The gypsum cement mixture of claim 10 wherein said additive includes at least one of aluminum sulfate, potassium sulfate, acids, proteinaceous retarders and calcium sulfate dihydrate.

12. The gypsum cement mixture of claim 11 wherein said calcium sulfate dihydrate is finely co-ground to a Blaine surface area of more than 12,000 m$^2$/g with a sugar.

13. The gypsum cement mixture of claim 1 wherein when 100 parts of said mixture is mixed with less than 40 parts water to make a slurry, said slurry expands less than 0.01% as it cures.

14. A gypsum cement slurry composition comprising:
hydraulic cement;
calcined gypsum;
polycarboxylate dispersant, wherein said polycarboxylate dispersant is a co-polymer based on oxyalkyleneglycol-alkyl ethers and unsaturated dicarboxylic acid derivatives; and,
less than 40 parts water per 100 parts by weight of the dry ingredients.

15. The slurry of claim 14 wherein said water comprises less than 25 parts per 100 parts by weight of the dry ingredients.

16. The slurry of claim 14 wherein said hydraulic cement is present in amounts of from 30-70 parts, said calcined gypsum is present in amounts of from 30-70 parts and said polycarboxylate dispersant is present in amounts of from 0.10 to 10 parts per 100 parts by weight of the total solids of the composition.

17. The slurry of claim 14 wherein said slurry expands less than 0.01% as it cures.

18. A method of making a cast article comprising:
measuring dry ingredients including from about 30 parts to about 70 parts calcined gypsum, from about 30 parts to about 70 parts hydraulic cement, and from about 0.1 to about 10 parts polycarboxylate dispersant, wherein said polycarboxylate dispersant is a co-polymer based on oxyalkyleneglycol-alkyl ethers and unsaturated dicarboxylic acid derivatives;
measuring less than 40 parts water per 100 parts by weight of the dry ingredients;
blending the dry ingredients into the water;
forming a slurry;
pouring said slurry into a mold having an appropriate shape to form the cast article;
allowing said slurry to cure; and
removing the cast article from the mold.

19. The method of claim 18 further comprising adding a wet aggregate to the slurry prior to said pouring step.

\* \* \* \* \*